United States Patent [19]

Tomkins et al.

[11] Patent Number: 4,917,497
[45] Date of Patent: Apr. 17, 1990

[54] METHOD OF AND APPARATUS FOR THE POSITIONAL DETECTION OF OBJECTS

[75] Inventors: Donald W. Tomkins, Loughborough; Laurence Holden, Yiewsley, both of England

[73] Assignee: Holtronic Technologies Limited, London, England

[21] Appl. No.: 80,458

[22] Filed: Jul. 31, 1987

[30] Foreign Application Priority Data

Aug. 4, 1986 [GB] United Kingdom ............... 8619006

[51] Int. Cl.$^4$ ............................................. G01B 9/021
[52] U.S. Cl. .................................................. 356/347
[58] Field of Search ................................ 356/347, 348

[56] References Cited

U.S. PATENT DOCUMENTS 3,592,548 7/1971 Majkowski ......................... 356/347
3,711,202 1/1973 Rush et al. .......................... 356/348

FOREIGN PATENT DOCUMENTS 1367740 9/1974 United Kingdom .
1570428 7/1980 United Kingdom .

OTHER PUBLICATIONS

Dirtoft et al., "Holgraphic Measuring of Deformations in Complete Upper Dentures", *Proc. Soc. Photo-Opt. Instrum. Eng,* (vol. 211) pp. 106–110, 1979.

Xu et al., "Holographic Technique for Simultaneous Measurement of Displacement and Tilt", *Applied Optics,* vol. 22, No. 14 (15 Jul. 1983) pp. 2137–2140.

Bjelkhagen, Hans, "Sandwich Holography for Compensation of Rigid Body Motion and Reposition of Large Objects", Proc. Soc. Photo–Opt. Instrum. Eng (vol. 210) 1979, pp. 123–127.

*Primary Examiner*—Richard A. Rosenberger
*Attorney, Agent, or Firm*—Leo Stanger

[57] ABSTRACT

A holographic technique for the detection of position of known items so as to be able to reject those samples which do not lie within certain defined spatial parameters. A plate which contains a single exposure of the three dimensional holographic image of an object is illuminated by parallel reference beams from a laser to allow the reconstruction of a real focused image of the object. A displacement translator supports the object and permits displacement thereof in three directions all at right angles to one another. The coincidence of the object and its holographic image are detected either optically by means of a stereoscopic microscope, or electrically by means of a stereoscopic microscope and a photo-diode.

14 Claims, 5 Drawing Sheets

METHOD OF AND APPARATUS FOR THE POSITIONAL DETECTION OF OBJECTS

FIELD OF THE INVENTION

The present invention relates to a method of and apparatus for the positional detection of objects.

In particular it is directed to a holographic technique for the detection of position of known items (such as wires) and the rejection of those samples that do not lie within certain defined spatial parameters.

BACKGROUND THEORY

The practical problem that illustrates the need for such a system is in the inspection of the physical connections between silicon integrated circuit "chips" and their mechanical carriers. These connections are made by thin wires (10–500 μm) running between small solder pads on the wafer and pins in the casing. The positioning of these wires is critical and must be maintained within certain limits. At present this is done manually by human operators who visually inspect each chip and reject those that lie outside the acceptable limits. The ideal system would, however, comprise a relatively cheap mechanical apparatus that would give a simple pass or fail test to each item.

With this problem in mind a programme of experiments was devised to see if holography could be utilised as a tool in this type of inspection. Holography offers the capability of recording the spatial detail of an object from many different perspectives.

An approach was tried to see if the "test object" could be compared by super-imposition with a virtual image hologram of the "perfect object" on a microscopic level. Several problems were soon encountered:

(a) It was discovered that for any comparison to be possible, either a human operator or a very sophisticated image analysis device was required.

(b) When smaller (less than 0.5 mm) objects were examined microscopically the problem of laser speckle soon limited the optical resolution.

A second approach which is adopted by the present invention, utilizes a real focused image hologram of the "perfect object". The image is of the pseudoscopic form (i.e. inside-out and back-to-front) and allows a real "test object" to be positioned within the confines of the focused image formed in space by the hologram. By simply measuring, for example, the light scattered back by the real object, a measure of coincidence can be detected.

Before describing the system of the present invention in detail, a brief theoretical discussion will be given with reference to FIGS. 1 to 4 of the accompanying drawings.

In FIGS. 1 to 4, the components shown are as follows:

A-a laser
B-a beam splitter
L1 and L2-lenses
M1-a flat mirror
M2-a collimating mirror
O-an object
P-a plate
Q-back scattered light
H-a hologram
D-viewer or detector
R-collimated reference light.

PRIOR ART

One known method of and apparatus for comparing an object with a reference specimen is disclosed in British Patent Specification No. 1,570,428. One application is to compare workpieces in respect of their form with a specimen. However, the system described is only a two dimensional system it relies on the technique of using a photographic plate which stores the interference pattern of the Fourier transform of the specimen object with the reference beam.

Another known holographic testing apparatus is disclosed in U.S. Pat. Specification No. 3,711,202, which is specifically detected to holographic analysers for inspecting aircraft structural sections. It relies on a double exposure technique involving an interferometric interference of waves between two exposures.

A further measurement device permitting measurement of the displacement is disclosed in British Patent Specification No. 1,367,740. However, in this technique only a virtual image of a graduated rule can be formed and there is no possibility of being able to form a focused image.

SUMMARY OF THE INVENTION

The present invention thus makes use of the holographic techniques discussed in connection with FIGS. 1 to 4 in order to provide a holographic positional detection system which overcomes the problems and disadvantages of the known and proposed methods referred to above.

According to a first aspect of the present invention, there is provided a method of positional detection of objects, including the steps:

(a) preparing a hologram which records the three dimensional image of an object by means of a single exposure;

(b) positioning the prepared hologram in parallel reference beams of coherent light to allow the reconstruction of a real focused image of the object;

(c) positioning the object to coincide with the image formed by the hologram which has been excited by the coherent light; and (d) detecting optically or electrically the coincidence of object and its holographic image.

Alternately, the step of detecting the coincidence of the object may be performed by detecting either visually or electrically a "null" or substantially zero optical signal.

In another form, a combination of the maximum optical signal detection and the null methods may be employed as a double check.

According to a second aspect of the present invention mthere is provided apparatus for the positional detection of objects, including;

(a) a plate which contains a single exposure of the three dimensional holographic image of an object whose positional detection is to be ascertained;

(b) means for illuminating said holographic plate in parallel reference beams of coherent light to allow the reconstruction of a real focused image of the object;

(c) means for supporting said object and being capable of displacing said object in any one or more of three directions all at right angles to one another; and (d) means for detecting optically or electrically, the coincidence of the object and its holographic image.

The means for illuminating the holographic plate is peferably a laser.

The supporting and displacement means is preferably a displacement translator which can move the object along the X, Y and Z co-ordinate directions with respect to the holographic plate.

In the case where the detection is carried out optically, a stereoscopic microscope is used, and the detection of coincidence is made visually by a skilled observer.

In the case where the detection is carried out electrically, a stereoscopic microscope and photo-diode are used, the microscope focusing the optical output signal onto a photo-diode.

For detecting the coincidence of the object with its holographic image, one may either utilize the detection of a maximum optical output signal or a "null" or substantially zero output signal, depending on where the detection means is located in relation to the object and its holographic image recorded on the plate.

A combination of the two above methods of detection may be used with advantageous results.

BRIEF DESCRIPTION OF THE DRAWINGS

The present invention will now be described in greater detail by way of examples with reference to the Figures of the accompanying drawings, wherein.

DESCRIPTION OF THE PREFERRED EMBODIMENT

Figure 1:
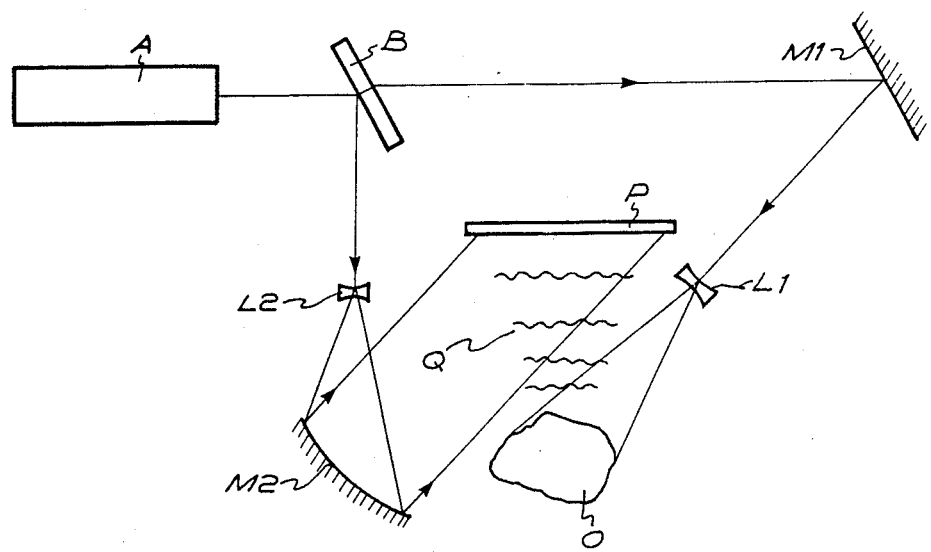
FIG. 1 is a diagrammatic illustration of a prior art system of making a hologram.
Figure 2:
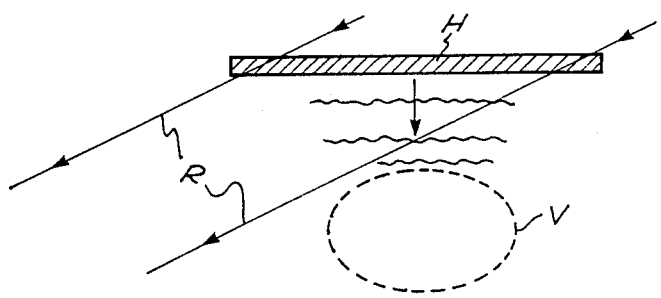
FIGS. 2 to 4 are diagrammatic illustrations of viewing the hologram prepared according to the prior art method of FIG. 1.

Referring first to FIGS. 1 and 2, if a laser-lit hologram, made in FIG. 1, and is "time-reversed" on replay, a pseudoscopic image V is produced in the same position as the original object O.

Figure 3:
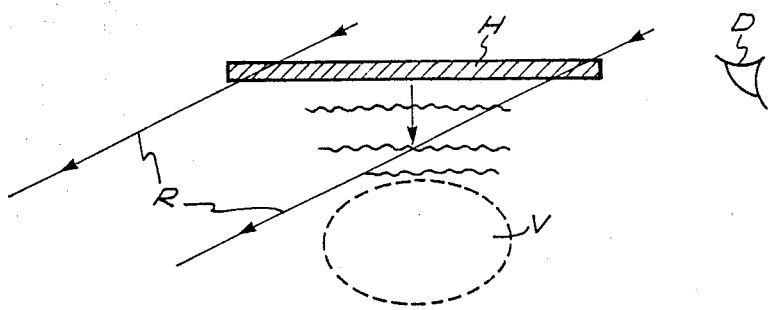
Figure 4:
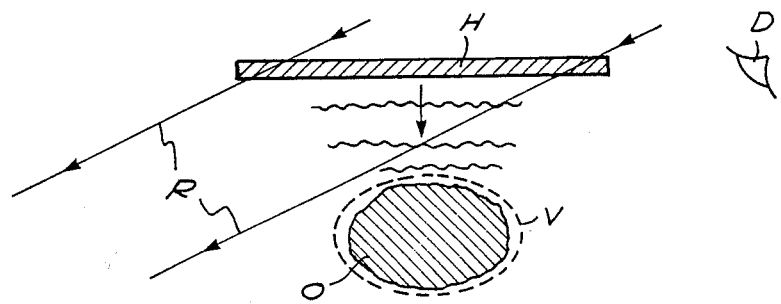

However, referring to FIG. 3, if the viewer or detector D is placed as shown, he will observe nothing, since no light can reach him at this position. If as shown in FIG. 4, the object is replaced in the same position approximately, then where the image and object overlap in space the object will scatter light back to the viewer or a detector D where such a device is provided.

Thus, if the object is reasonably "simple" in shape, a maximum will only be obtained in the scattered back light when the image and object are exactly coincident. This is partly as a result of the degree of accuracy to which the light is brought to focused points in the image. This is a direct result of the size of the hologram and the quality of the processing chemistry used to make it.

Figure 5A:
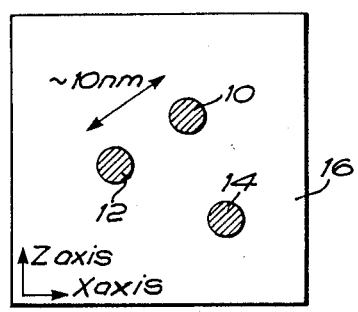
FIGS. 5A and 5B are respectively a plan section and side elevation view of an example of an object which is suitable for testing in the system of the present invention.
Figure 5B:
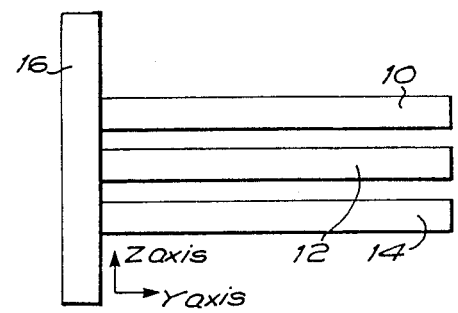

Referring to FIG. 5, the object as chosen to demonstrate the system of the present invention is in the form of three thin wires 10, 12 and 14 of equal diameter (approximately 1 mm). These three wires are mounted on a base 16 so as to project perpendicularly therefrom, the wires being approximately parallel to one another and are provided with a matt white surface.

Figure 6:
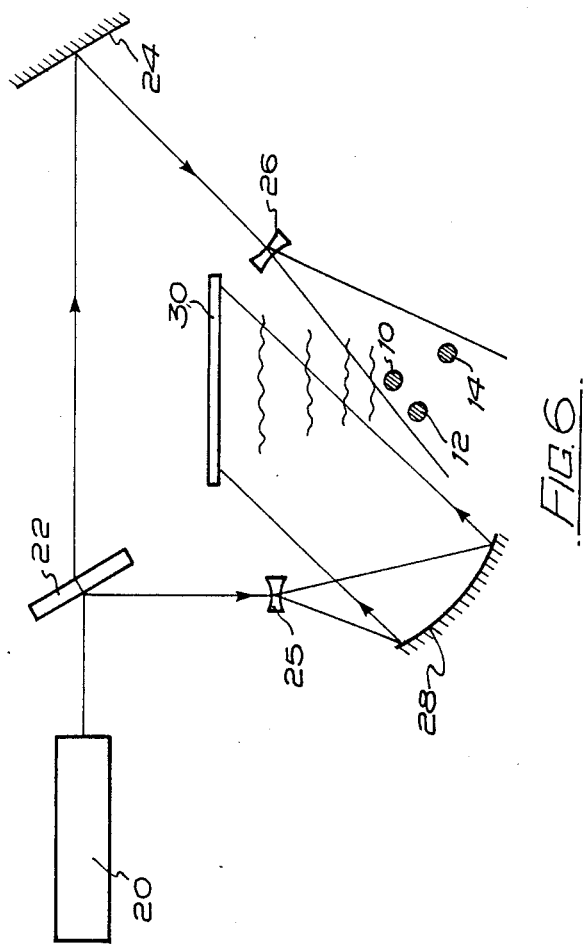
FIG. 6 is a diagrammatic illustration of one preferred method of making the hologram of the object in question.

Referring next of FIG. 6, a holographic recording of these three wires was made using apparatus which includes a laser 20, a beam splitter 22, a mirror 24, a pair of lenses 25 and 26, a collinating mirror 28 and a holographic recording plate 30.

The laser 20 is a Krypton laser which generates a coherent radiation at a wavelength of 647 nm. The beam splitter 22 divides the coherent radiation into two paths. The first path which comprises 90% of the radiation passes through the beam splitter 22 and is reflected by the mirror 24 towards the concave lens 26. The lens 26 causes the rays to diverge and illuminate the object which comprises the groups of three wires 10, 12 and 14. The second path which comprises 10% of the radiation forms the reference beams and after passing through the concave lens 25, the diverging rays are reflected towards the plate 30 as parallel rays, by means of the concave collinating mirror 28. Due to the interference between light emitted from the illuminated object and the reference beam, a holographic image of the object (the three wires 10, 12 and 14) is formed in the recording emulsion of the plate 30.

Figure 7:
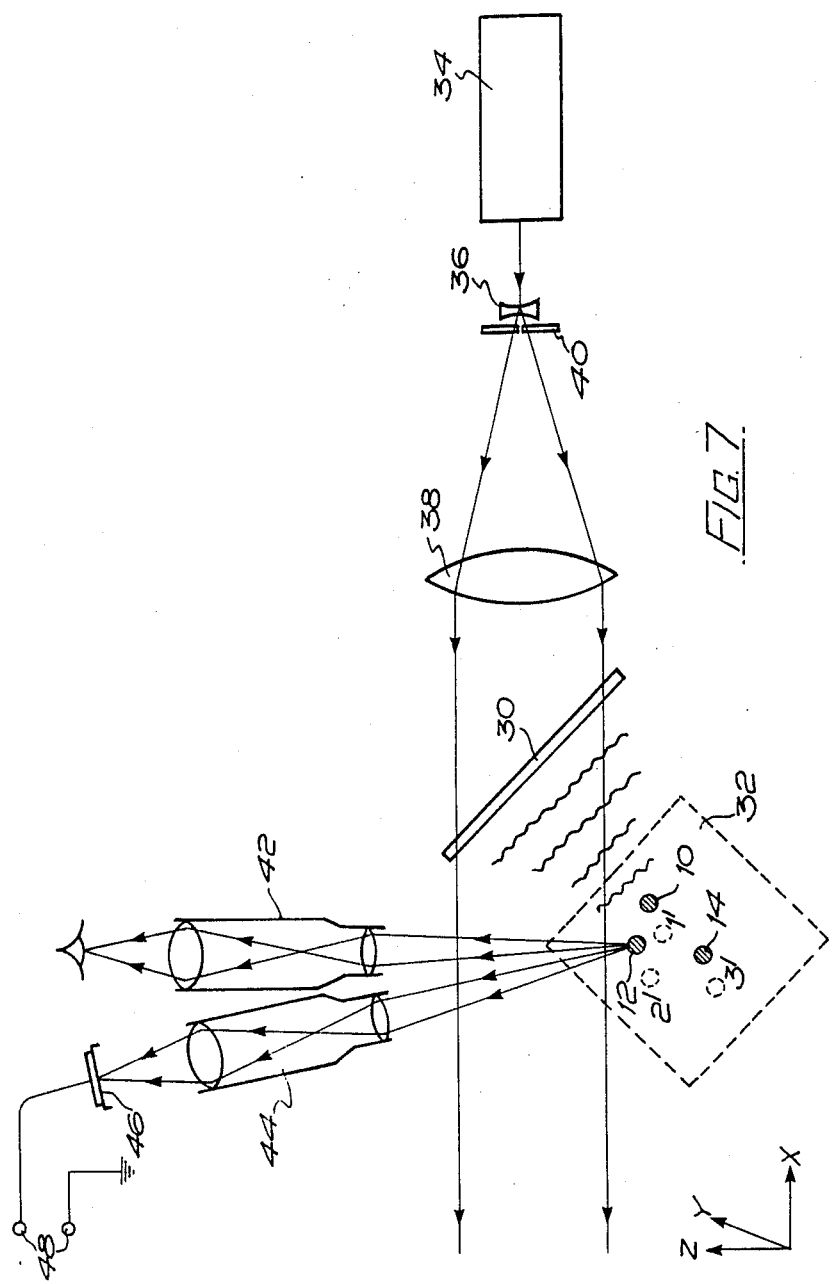
FIG. 7 is a diagrammatic illustration of one preferred form of holographic positional detection system.

Referring now to FIG. 7, the object which comprises the three wires 10, 12 and 14 has its base 16 mounted on a translator 32. This translator can be moved in the X, Y and Z directions. The translator 32 is positioned so as to be perpendicular to the plate 30 on which the holographic has been formed as described above. The plate 30 containing the holographic image is illuminated by means of a Helium/Neon or Krypton laser 34 after the coherent light generated therefrom has passed through a collimating optic comprising a concave lens 36 and a convex lens 38 to form parallel rays of coherent light.

A pin hole diaphragm 40 may optionally be provided adjacent the concave lens 36 in order to clean up the image.

In order to detect a maximum optical signal, this can either be done visually using a trained observer or electrically using a photodiode. FIG. 7 shows both methods of detecting a maximum optical signal. In the first case a stereoscopic microscope 42 is positioned as shown. In the second case a second stereoscopic microscope 44 focuses the optical signal onto a photo-diode 46. This provides an electrical output at the terminals 48 which can be measured by any suitable electrical detector, for detecting a maximum optical signal.

It should be noted that a maximum optical signal will only be detected when there is co-incidence between the replayed holographic image from the holographic plate 30 and the object itself. As shown in FIG. 7, the dotted circles (1', 2' and 3') represent the holographic images of the three wires 10, 12 and 14 and since these (as shown) are not coincident with the actual three wires (10, 12 and 14) located on the displacement translator, an optical signal maximum will not occur. In order to obtain coincidence the displacement translator 32 has to be moved in the X, Y and Z directions by appropriate amounts.

Figure 8:
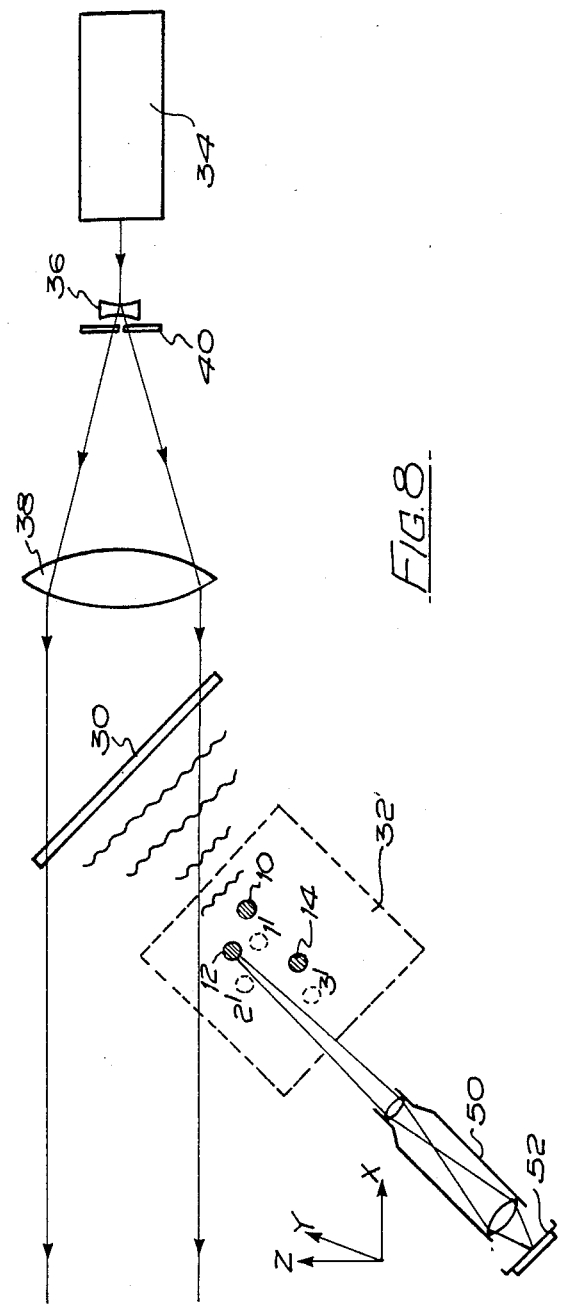
FIG. 8 is a diagrammatic illustration of an alternative form of holographic positional detection system.

In the alternative system shown in FIG. 8, where a null is detected where there is coincidence between the holographic image and the object, a third stereoscopic microscope 50 is positioned perpendicular to the holographic plate 30. This null can either be detected visually with the aid of a trained observer or electrically by means of the photodiode 52.

In order to verify the satisfactory operation of the system disclosed in FIG. 7, a number of tests with the object shown in FIG. 5 as well as other objects were carried out in detail. A brief summary of these tests is set out hereunder:

(a) A visual examination was made of the coincidence of the test object and image and a dramatic effect was observed. Unless the image overlaid the object accurately, little light was scattered back to the observer. However, when coincidence was achieved a very bright back scatter occured.

(b) Using the stereoscopic microscope 44 at lower power, a small part of the object (one wire only) was observed and simultaneously a reading of image intensity was made using the large area photodiode 46 in the image plane. A series of plots was made of intensity of back scatter versus position of real object, moving the wires along one of the three perpendicular axes at any time. From the plots obtained it was possible to note that moving the wire by half a diameter away from coincidence was sufficient to produce a substantial effect (of the order of 50% reduction) even in the direction roughly parallel with the wires.

(c) A visual observation using a single relatively "thick-wire" image in coincidence with a real thin wire also produced a good distinction between the case where the real wire lay within the image or outside it. The intensity effect was not quite as marked as one would expect because with the thick wire light was being focused to all points around a relatively larger cylindrical surface, hence the positioning of the real small wire was less critical within those limits.

In both cases (a) and (b) above, the measured analogue optical signal can be simply interpolated into a decision of acceptance or rejection. A comparison of measured signal with a pre-set, but variable reference voltage offers the means from which a binary electrical signal can be extracted. This signal may therefore be used to activate a warning, indicating rejection of a particular sample. The variable reference voltage thus performs the role of setting a threshold level of acceptance which may be directly related to the degree of superimposition between the holographic image and the test objection. In practice, for this setting to have any meaning in absolute terms, a calibration curve has to be prepared to relate the measured optical signal to the absolute spatial displacement of a "standard" object from its "standard" spatial position. It should be noted that the system obtains a differential signal for one of two reasons:-

(a) The test object is physically identical to the standard object, but is displaced from the standard spatial position.

(b) The test object is not exactly physically identical to the standard object, but its surfaces occupy sufficient of the standard space to produce an identical degree of reflective light to that observed in (a).

Thus, it will be appreciated that the system shown in FIG. 7 cannot differentiate the above cases by means of a single measurement and/or single threshold setting. In order to decide which of cases (a) and (b) above apply, it is necessary to use a combination of the system shown in FIG. 7 with the "null" detection system shown in FIG. 8.

The systems described above with reference to FIGS. 7 and 8, enable one to examine a volume of space defined by the solid angle projected from the position of the focused surface points of the object to the boundary of the hologram plate. A degree of enhanced sophistication in the detection of spatial position could be obtained by the use of more than one hologram, arranged to view difference perspectives of the "standard" object. This would be particularly necessary for non simple objects containing re-entrant surfaces and/or surface features which could not be "seen" via a single viewing aperture (i.e. hologram).

Thus an object with one or more re-entrant surfaces could be checked by means of a plurality of holographic images whose insertion into the reference beam of coherent light could be synchronized with movement of the object on its displacement translator.

Thus, the industrial application of the above described systems could be almost limitless. Already there are plenty of uses in the field of positioning and quality control of simply shaped objects. For example, it has been found that spiral shapes are very easily positioned using this technique and hence there could be a use in the accurate positioning of lamp filaments automatically. Another use could be in the inspection of drawn wires or tapes, as kinks will easily be detected. The technique is particularly sensitive in regard to two dimensional grids and as such, suggests itself as a useful method for the control or micropositioning of gauzes or grid type electrodes in thermionic devices etc. Further possibilities exist in using the technique to detect faults and/or holes in micro-filters, etc.

What is claimed is:

1. A method of positional detection of objects including the steps of:

A. preparing a hologram which records the three dimensional image of an object by means of a single exposure;

b. positioning the prepared hologram in parallel reference beams of coherent light to allow reconstruction of a real focused image of the object;

c. positioning the object to coincide with the real image formed by the hologram which has been excited by the coherent light so as to re-illuminate the object;

d. optically detecting the coincidence of the object and its holographic image by visually observing a maximum signal;

e. with the object and the image of the object having specific contours, carrying out the positioning and detecting steps to cause the object to detect the coincidence of the object and the real image substantially entirely on the basis of coincidence of the contours; and f. ascertaining the coincidence of the object and its holographic image by detecting a substantially zero signal from a position behind the object with respect to the hologram, simultaneously with observing the maximum signal, as a double check.

2. A method of positional detection of objects including the steps of:

a. preparing a hologram which records the three dimensional image of an object by means of a single exposure.

b. positioning the prepared hologram in parallel reference beams of coherent light to allow reconstruction of a real focused image of the object;

c. positioning the object to coincide with the real image formed by the hologram which has been excited by the coherent light so as to re-illuminate the object;

d. optically detecting the coincidence of the object and its holographic image by photoelectrically measuring a maximum signal; and e. with the object and the image of the object having specific contours, carrying out the positioning and detecting steps to cause the object to detect the coincidence of the object and the real image substantially entirely on the basis of coincidence of the contours.

3. The method according the claim 2, further including the steps of:

f. ascertaining the coincidence of the object and its holographic image by detecting a substantially zero signal from a position behind the object with respect to the hologram, simultaneously with photoelectrically measuring the maximum signal, as a double check.

4. The method according to claim 2, further including the step of:

f. comparing the measured maximum of the detected electrical signal with a preset reference electric signal in order to determine acceptance or rejection of a particular object.

5. A method of positional detection of objects including the steps of:

a. preparing a hologram which records the three dimensional image of an object by means of a single exposure.

b. positioning the prepared hologram in parallel reference beams of coherent light to allow reconstruction of a real focused image of the object;

c. positioning the object to coincide with the real image formed by the hologram which has been excited by the coherent light so as to re-illuminate the object;

d. ascertaining the coincidence of the object and its holographic image by detecting a substantially zero signal from a position behind the object with respect to the hologram; and e. with the object and the image of the object having specific contours, carrying out the positioning and ascertaining steps to cause the object to ascertain the coincidence of the object and the real image substantially entirely on the basis of coincidence of the contours.

6. The method according the claim 5, further including the steps of:

f. ascertaining the coincidence of the object and its holographic image by detecting a maximum signal from a position other than behind the object with respect to the hologram, simultaneously with observing the substantially zero signal, as a double check.

7. The method according to claim 6, wherein the coincidence detection is performed visually.

8. The method according to claim 6, wherein the coincidence detection is performed photoelectrically.

9. An apparatus for the position detection of objects, comprising:

a. a plate containing a single exposure of the three dimensional holographic image of an object whose positional detection is to be ascertained;

b. means for illuminating said holographic plate in parallel reference beams of coherent light to allow the reconstruction of a real focused image of the object;

c. means for supporting said object to coincide with the real image formed by said holographic plate so as to re-illuminate the object and for displacing the object in any one or more of there directions all at right angles to each other; and d. a stereoscopic microscope and a photo-diode for electrically detecting coincidence by detecting a maximum signal output from the photo-diode;

e. the object and the images having specific contours, said microscope and said photo-diode being arranged for detecting coincidence substantially entirely on the basis of the contours.

10. An apparatus as in claim 9, wherein the means for illuminating the holographic plate is a laser.

11. An apparatus as in claim 9 wherein the supporting an displacement means is a displacement translator for moving the object along X, Y, and Z coordinate directions with respect to the holographic plate.

12. An apparatus as in claim 9, further comprising a comparator for comparing the detected electrical signal with respect to a preset reference electric signal in order to determine acceptance or rejection of a particular object.

13. A method of positional detection of objects including the steps of:

a. preparing a hologram which records the three dimensional image of an object by means of a single exposure.

b. positioning the prepared hologram in parallel reference beams of coherent light to allow reconstruction of a real focused image of the object;

c. positioning the object to coincide with the real image formed by the hologram which has been excited by the coherent light so as to re-illuminate the object;

d. optically detecting the coincidence of the object and its holographic image by photoelectrically measuring a maximum signal; and e. ascertaining the coincidence of the object and its holographic image by detecting a substantially zero signal from a position behind the object with respect to the hologram, simultaneously with photoelectrically measuring the maximum signal, as a double check.

14. A method of positional detection of objects including the steps of:

a. preparing a hologram which records the three dimensional image of an object by means of a single exposure.

b. positioning the prepared hologram in parallel reference beams of coherent light to allow reconstruction of a real focused image of the object;

c. positioning the object to coincide with the real image formed by the hologram which has been excited by the coherent light so as to re-illuminate the object;

d. optically detecting the coincidence of the object and its holographic image by photoelectrically measuring a maximum signal; and e. comparing the measured maximum of the detected electrical signal with a preset reference electric signal in order to determine acceptance or rejection of a particular object.

* * * * *